United States Patent [19]
Blanchard

[11] 4,343,612
[45] Aug. 10, 1982

[54] OUTBOARD MOTOR INCLUDING A TWO SPEED TRANSMISSION

[75] Inventor: Clarence E. Blanchard, Kenosha, Wis.

[73] Assignee: Outboard Marine Corporation, Waukegan, Ill.

[21] Appl. No.: 158,118

[22] Filed: Jun. 11, 1980

[51] Int. Cl.³ .............................................. B63H 21/28
[52] U.S. Cl. ........................................ 440/75; 74/333; 74/372
[58] Field of Search ................. 440/75; 74/333, 362, 74/361, 366, 369, 371, 372; 192/41 R

[56] References Cited

U.S. PATENT DOCUMENTS

| | | | |
|---|---|---|---|
| 1,060,024 | 4/1913 | Price | 74/362 |
| 1,093,920 | 4/1914 | Deves | 74/371 |
| 1,241,924 | 10/1917 | Cole | 74/362 |
| 1,382,572 | 6/1921 | Thomas | 74/372 |
| 1,390,262 | 9/1921 | Anderson | 74/371 |
| 1,979,080 | 10/1934 | Roeder | 74/371 |
| 2,042,577 | 6/1936 | Baer et al. | 74/371 |
| 2,086,809 | 7/1937 | Kreis | 74/371 |
| 2,110,180 | 3/1938 | Semery | 74/371 |
| 2,165,201 | 7/1939 | Baumgartner | 74/363 |
| 2,861,461 | 11/1958 | Kreidler | 74/371 |
| 3,492,966 | 2/1970 | Kiekhaefer | 440/75 |
| 3,817,202 | 6/1974 | Holtermann | 440/89 |

*Primary Examiner*—Sherman D. Basinger
*Attorney, Agent, or Firm*—Michael, Best & Friedrich

[57] ABSTRACT

Disclosed herein is an outboard motor including a power head having an engine, a propulsion leg extending downwardly from the power head, an input shaft housed in the propulsion leg and driven by the engine, a drive shaft housed in the propulsion leg, a propeller shaft in the propulsion leg and drivingly connected to the drive shaft, and a propeller mounted on the propeller shaft. The outboard motor also includes a transmission for drivingly connecting the input shaft and the drive shaft, the transmission being housed in the propulsion leg above the propeller shaft and selectively and alternatively driving the drive shaft in forward and reverse directions and providing two forward speeds.

18 Claims, 4 Drawing Figures

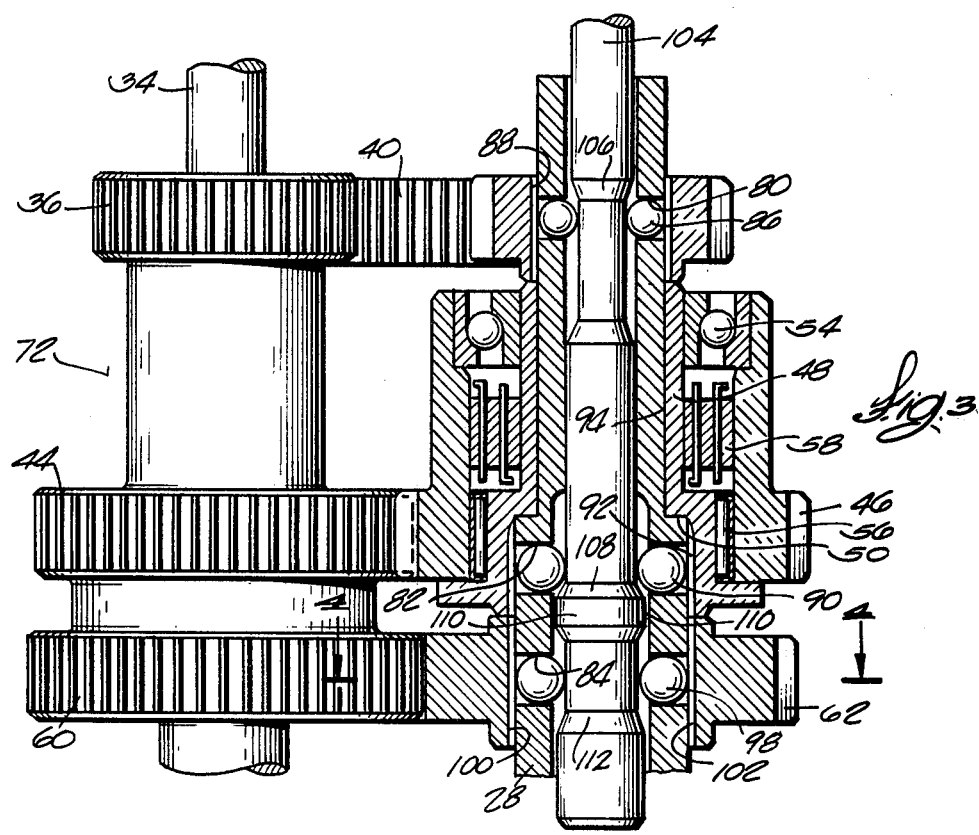

OUTBOARD MOTOR INCLUDING A TWO SPEED TRANSMISSION

FIELD OF THE INVENTION

The present invention relates to marine propulsion devices and more particularly to transmissions for marine propulsion devices providing for forward and reverse driving modes as well as two forward speeds.

BACKGROUND PRIOR ART

It is common practice to construct outboard motors such that they have forward and reverse gears located in a gear case below the water line and with the gears being mounted on the propeller shaft. An example of such a construction is shown in the Holtermann U.S. Pat. No. 3,817,202. In outboard motors having such a construction, shifting is accomplished by moving a clutch dog which comprises a spool that is splined to the propeller shaft and which has opposed faces selectively engageable with either the forward or reverse driven gears, the clutch dog being splined on the propeller shaft and being axially movable thereon between a position between the forward and reverse gears to alternative positions engaging those gears and thus driving the propeller shaft in the desired direction.

One of the potential problems of a construction as defined above is that the axially slidable clutch dog may be subjected to excessive stress and wear since the clutch dog is trying to center itself on two surfaces disposed at an angle of 90°, one of those surfaces being the spline on the propeller shaft and the other of those surfaces being the driving lugs on the forward or reverse driven gear.

Another potential disadvantage of the prior art construction lies in the required shape of the gear case. It is desired to make the gear case as small as possible in order to reduce the fluid drag on the outboard motor, and it is also desired to construct a gear case with a pointed parabolic shape. When the gear case must accommodate two gears, i.e. the forward and reverse driven gears on the propeller shaft as well as a shiftable clutch dog, the leading end of the gear case tends to become bulbous rather than the desired parabolic shape.

Examples of prior art transmissions are illustrated in the Cole U.S. Pat. No. 1,241,924; the Deves U.S. Pat. No. 1,093,920; the Anderson U.S. Pat. No. 1,390,262; and the Roeder U.S. Pat. No. 1,979,080.

Attention is also directed to the Baer et al. U.S. Pat. No. 2,042,577; the Kries U.S. Pat. No. 2,086,809; the Semery U.S. Pat. No. 2,110,180; the Baumgartner U.S. Pat. No. 2,165,201; and the Kriedler U.S. Pat. No. 2,861,461.

SUMMARY OF THE INVENTION

The present invention includes an outboard motor having a gear case housing only a single gear on the propeller shaft, whereby the gear case configuration can be smaller and or have an improved parabolic shape and wherein the gears for permitting shifting of the motor from forward to reverse are conveniently housed in the propulsion leg of the motor. The outboard motor transmission is also constructed to include means for providing two forward speeds and wherein the transmission does not include a neutral mode between the first and the second forward speeds.

More specifically, the invention includes an outboard motor comprising a power head including an engine, and a propulsion leg extending downwardly from the power head, an input shaft housed in the propulsion leg and driven by the engine, a drive shaft housed in the propulsion leg, a propeller shaft in the propulsion leg, means for drivingly connecting the drive shaft and the propeller shaft, and a propeller mounted on the propeller shaft for rotation. The outboard motor also includes transmission means for drivingly connecting the input shaft and the drive shaft, the transmission means including means for selectively and alternatively driving the drive shaft in forward and reverse directions.

In one embodiment of the invention the transmission includes first drive means between the input shaft and the drive shaft for selectively drivingly connecting the input shaft and the drive shaft, and including a first gear mounted on the input shaft and a first driven gear driven by the drive gear and mounted on the drive shaft, said first drive means selectively driving said drive shaft in the same rotational direction as the input shaft. The transmission also includes second drive means for selectively drivingly connecting the input shaft and the drive shaft, the second drive means including a second drive gear mounted on the input shaft and a second driven gear mounted on the drive shaft and in meshing engagement with the second drive gear, the second drive means having an input-output speed ratio with a first value. The transmission further includes third drive means for selectively drivingly connecting the input shaft and the drive shaft, the third drive means including a third drive gear mounted on the input shaft and a third driven gear mounted on the drive shaft and in meshing engagement with the third drive gear, the third drive means having an input-output speed ratio having a second value greater than the first value, the gears being mounted on one of the input shaft and the drive shaft being drivingly connected to that shaft, and means for alternatively and selectively drivingly connecting the gears mounted on the other of the input shaft and said drive shaft to that other shaft.

In one embodiment of the invention a oneway overrunning clutch drivingly connects one of the second driven gear and the third driven gear to the drive shaft.

In one embodiment of the invention the drive gears are driven by the input shaft, the drive shaft includes an axially extending bore, and the means for drivingly connecting one of the driven gears to the drive shaft includes a shiftable member housed in the axially extending bore and being shiftable between a first position, a second position, and a third position. Also included are means for drivingly connecting the first driven gear to the drive shaft when the shiftable member is in the first position, for drivingly connecting the second driven gear to the drive shaft when the shiftable member is in the second position, and for drivingly connecting the third driven gear to the drive shaft when the shiftable member is in the third position.

One of the principal features of the invention is the provision in the transmission means of means for alternatively and selectively driving the drive shaft at a first forward speed and at a second forward speed.

Another of the principal features of the invention is the provision in the transmission means of means for shifting from the first forward speed to the second forward speed and for maintaining driving connection between the input shaft and the drive shaft during such shifting.

In one embodiment of the invention the transmission means includes a first drive gear, a second drive gear, and a third drive gear, the drive gears being driven by the input shaft, a first driven gear driven by the first drive gear, a second driven gear driven by the second drive gear, and a third driven gear disposed in meshing engagement with the third drive gear and being driven by the third drive gear, and means for alternatively and selectively connecting one of the driven gears to the drive shaft for rotatably driving the drive shaft.

In one embodiment of the invention the drive shaft includes a central axially extending bore, a selector shaft housed in the bore, the selector shaft being selectively axially movable in the bore between a neutral position, a second position, a third position, and a fourth position, and means for alternatively drivingly connecting the first driven gear to the drive shaft when the selector shaft is in the second position, for alternatively drivingly connecting the second driven gear to the drive shaft when the selector shaft is in the third position, and for alternatively drivingly connecting the third driven gear to the drive shaft when the selector shaft is in the fourth position.

The invention also includes an outboard motor comprising a power head including an engine, a propulsion leg extending downwardly from the power head, an input shaft housed in the propulsion leg and driven by the engine, a drive shaft housed in the propulsion leg, means for drivingly connecting the drive shaft and the propeller shaft, and a propeller mounted on the propeller shaft for rotation therewith. The outboard motor also includes transmission means for drivingly connecting the input shaft and the drive shaft, a first driven gear meshing with the first drive gear and being driven by the first drive gear, and a second driven gear meshing with the second drive gear and being driven by the second drive gear. Means are also provided for alternatively and selectively connecting one of the driven gears to the drive shaft for rotatably driving the drive shaft, the connecting means including a selector shaft carried in the axially extending bore and being shiftable between a first position, a second position, and a third position, the driven gears being freely rotatable with respect to the drive shaft when the selector shaft is in the first position. Means are further provided for drivingly connecting the first driven gear to the drive shaft when the selector shaft is in the second position and for drivingly connecting the second driven gear to the drive shaft when the selector shaft is in the second position.

One of the principal features of the invention is the provision of a sleeve surrounding the drive shaft, the first driven gear surrounding the sleeve, and the provision of an overrunning clutch between the sleeve and the first driven gear.

In one embodiment of the invention the drive shaft includes at least a pair of transverse bores therethrough, the bores being axially spaced apart, and the means for drivingly connecting includes a first movable member housed in one of the bores and movable from a first position to a position wherein the movable member engages the sleeve and causes the sleeve to be driven with the drive shaft, and further includes a second movable member housed in a second of the bores and being movable from a first position to a position engaging the second driven gear and causing the second driven gear and the drive shaft to rotate together. The selector shaft includes means for causing the first movable member to move into engagement with the sleeve when the selector shaft is moved to the first position and means for causing the second movable member to move into engagement with the second driven gear when the selector shaft is moved to a second selector shaft position.

Various other features and advantages of the invention are set forth in the following description of a preferred embodiment, in the claims and in the drawings.

BRIEF DESCRIPTION OF THE DRAWINGS

FIG. 3 is an enlarged cross section elevation view of the transmission shown in FIG. 1.

FIG. 4 is a cross section view taken along line 4—4 in FIG. 3.

Figure 1:
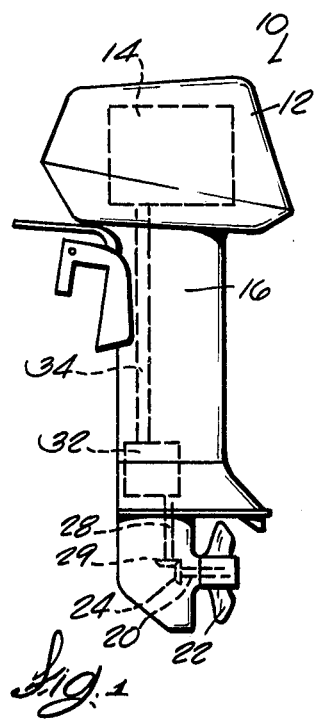
FIG. 1 is an elevation view of a marine propulsion device incorporating various features of the invention.

Before describing a preferred embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

DESCRIPTION OF A PREFERRED EMBODIMENT

Illustrated in FIG. 1 is a marine propulsion device shown as comprising an outboard motor 10, the outboard motor 10 including a power head 12 which houses an internal combustion engine 14 and a lower unit 16. Rotatably mounted in the lower unit 16 is a propeller shaft 20 carrying at its outer end a propeller 22. Also located within the lower unit is a gear 24 carried by and drivingly connected to the propeller shaft 20. Extending through the lower unit 16 is a rotatably mounted drive shaft 28 carrying a lower bevel gear 29 which meshes with the gear 24. The drive shaft 28 is drivingly connected to the engine 14 through a transmission, designated generally by the reference numeral 32.

Figure 2:
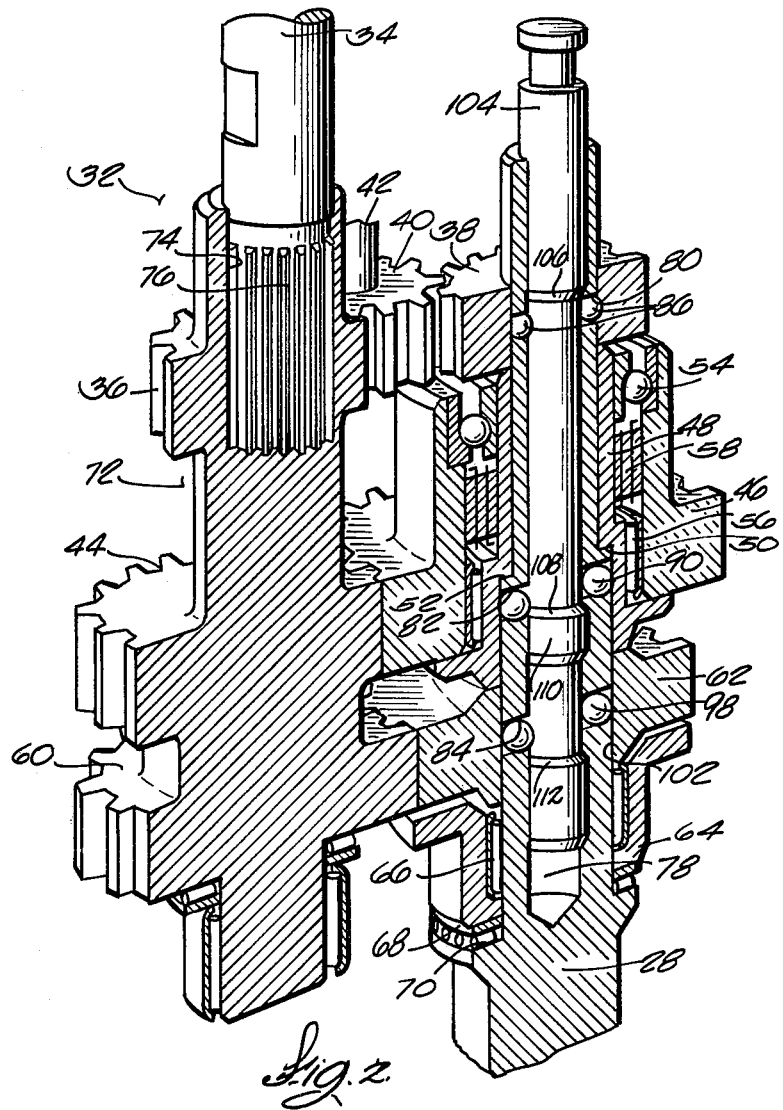
FIG. 2 is an enlarged perspective view of the transmission shown in FIG. 1 and with portions broken away in the interest of clarity.

The transmission 32, shown in greater detail in FIGS. 2 through 4, includes a rotatably mounted input shaft 34 drivingly connected to the engine 14 and means for selectively drivingly connecting the input shaft 34 to the drive shaft 28 such that the drive shaft can be driven alternatively and selectively in forward and reverse directions and such that the drive shaft can be alternatively and selectively driven at a first forward speed and at a second forward speed. More specifically, the means for selectively drivingly connecting the input shaft 34 to the drive shaft 28 includes a first drive means adapted to drive the propeller 22 in the reverse direction, such means including a first drive gear 36 mounted for rotation with the input shaft 34, a reverse or first driven gear 38 mounted on the drive shaft, and an idler gear 40 supported for rotation by a third shaft 42 and meshing with the first drive gear 36 and the gear 38 and providing a driving connection between them such that the driven gear 38 is driven in the same rotational direction as the first drive gear 36.

The means for selectively drivingly connecting the input shaft 34 to the drive shaft 28 also includes a second drive means including a second drive gear 44 mounted for rotation about the axis of the input shaft 34 and being driven by the input shaft. The second drive gear 44 meshes with a second driven gear 46 mounted for rotation about the axis of the drive shaft 38. The drive shaft 28 is surrounded by a sleeve 48 adapted to be rotatable around the drive shaft. The sleeve 48 includes an upper end adjacent the first driven gear 38 and a shoulder 50 adapted to be positioned against a shoulder 52 of the drive shaft. The outer surface of the sleeve 48 supports a pair of bearings 54 and 56, the bearings 54 and 56 supporting the second driven gear 46 for rotation with respect to the sleeve 48.

The second drive means is also shown as including an overrunning clutch 58 located between the second driven gear 46 and the sleeve 48, the overrunning clutch 58 providing a driving connection between the second driven gear 46 and the sleeve 48 such that the second driven gear 46 can rotatably drive the sleeve 48 but permitting the sleeve to rotate at a higher speed than the second driven gear 46 in the event the sleeve 48 is driven by the drive shaft 28 at a rotational speed greater than that of the second driven gear 46.

The means for selectively drivingly connecting the input shaft 34 and the drive shaft 28 also includes a third drive means comprised of a third drive gear 60 and a third driven gear 62 in enmeshing engagement with the third drive gear. The third drive gear 60 is supported for rotation with the input shaft 34 and the first and second drive gears. The third driven gear 62 is supported for rotation on the drive shaft 28 and is rotatable with respect to the drive shaft. In the particular construction illustrated, the third driven gear 62 is supported by a bushing 64 surrounding the drive shaft 28. A bearing 66 and a thrust bearing 68 resting on a shoulder 70 of the drive shaft support the bushing 64 for rotation about the drive shaft 28.

In the illustrated arrangement the first drive gear 36, second drive gear 44 and third drive gear 60 form a cluster gear 72 with the first drive gear, second drive gear and third drive gear being spaced apart axially with respect to the axis of rotation of the input shaft and being integrally joined together. The upper end of the cluster gear includes a splined longitudinal bore 74 housing a splined end 76 of the input shaft 34 wherein the cluster gear 72 is driven with the input shaft.

Means are further provided for alternatively and selectively drivingly connecting the first driven gear 38, the second driven gear 46 and the third driven gear 62 to the drive shaft for rotatably driving the drive shaft 28. While such means can have various constructions, in the particular embodiment illustrated, a ball clutch arrangement is provided. More particularly, the drive shaft 28 includes a central axially or longitudinally extending bore 78 and a plurality of transverse bores 80, 82 and 84 spaced along the length of the drive shaft. The transverse bores 80 house balls 86 adapted to move radially outwardly into engagement with first driven gear 38 and to be received in indentations 88 in the central bore (FIG. 3) of the first driven gear 38 so as to provide a driving connection between the first driven gear 38 and the drive shaft 28. The transverse bores 82 similarly house balls 90 which are movable from a retracted position into indentations 92 in the sleeve 48 for causing a driving connection between the sleeve 48 and the drive shaft 28. The transverse bores 84 similarly house balls 98 adapted to move from radially inward or retracted positions as shown in FIG. 3 into indentations 100 in the bore 102 of the third driven gear 62 and being operable to cause the third driven gear 62 to drive the drive shaft 28.

Means are also provided for selectively and alternatively causing the balls 86, 90 and 98 to be forced outwardly into engagement with the first driven gear 38, the sleeve 48, and the third driven gear 62, respectively. In the illustrated construction such means includes a selector shaft 104 which is housed in the bore 78 in the drive shaft 28 and is axially displaceable therein from a neutral position, illustrated in FIGS. 2 and 3, wherein none of the balls 86, 90 and 98 are forced outwardly into engagement with the associated gears, to a downward position wherein the balls 86 are forced into engagement with the first driven gear 38 wherein a driving relationship is formed between the first driven gear 38 and the drive shaft 28. When the selector shaft is forced downwardly, the conical shoulder 106 of the selector shaft 104 will engage the balls 86 thereby forcing them outwardly into contact with the first driven gear 38. It is noted that the selector shafts 104 shown in FIGS. 2 and 3 differ in minor structural detail.

When the selector shaft 104 is moved in the opposite direction or upwardly, the shoulder 108 of the selector shaft 104 will engage the balls 90 and force them outwardly into the indentations 92 in the sleeve 48 thereby providing a driving connection between the sleeve 48 and the drive shaft 28. The second driven gear 48, in turn, drives the sleeve 48. Such upward movement of the selector shaft 104 to cause outward movement of the balls 90 simultaneously permits retraction of the balls 86 to a radially inward position wherein the first driven gear 38 is again freely rotatable with respect to the drive shaft 28.

In the event that the selector 104 is moved further upwardly with respect to the drive shaft 28, the land 110 of the selector shaft 104 will maintain the balls 90 in engagement with the sleeve 48, and the shoulder 112 of the selector shaft 104 will cause outward movement of the balls 98 into the indentations 100 in the third driven gear 62 to cause driving engagement between the third driven gear 62 and the drive shaft 28.

The drive ratio between the second drive gear 44 and the second driven gear 46 is lower than the drive ratio between third drive gear 60 and the third driven gear 62 whereby the third driven gear 62 tends to drive the drive shaft 28 at a rotational speed greater than the second driven gear 46. Accordingly, when the selector shaft 104 is moved so as to cause the third driven gear 62 to drive the drive shaft 28, the sleeve 48 will be driven at a rotational speed greater than the rotational speed of the second driven gear 46. The overrunning clutch 58 between the second driven gear 46 and the sleeve 48 permits the sleeve 48 to overrun the second driven gear 46 when the drive shaft 28 is driven by the third driven gear 62.

While the particular embodiment of the invention illustrated shows the selector shaft 104 as being housed in the drive shaft 28 and the drive gears 36, 44 and 60 as being fixed to the input shaft 34, in other embodiments of the invention, means could be provided for selectively drivingly connecting selected ones of the drive gears 36, 44 and 60 to the input shaft 34 in which case the driven gears 38, 46 and 62 would be fixedly joined to the drive shaft 28 for driving the drive shaft. In such an embodiment of the invention, the input shaft 34 could be provided with an axially extending bore housing a selector shaft and with ball clutch means operably selectively and alternatively connecting the first drive gear, the second drive gear and the third drive gear to the input shaft, with such driving connection being controlled by movement of the selector shaft.

While the particular embodiment illustrated includes an overrunning clutch 58 between the second driven gear 46 and the drive shaft 28, it will be appreciated by those skilled in the art that in alternative constructions the one-way overrunning clutch 58 could be located between the second drive gear 44 and the input shaft 34.

One of the advantages of the illustrated construction is that shifting can be accomplished between the lower forward speed and the higher forward speed without going through a neutral mode. As described above, shifting from the lower forward speed to the higher forward speed is accomplished by moving the selector shaft 104 upwardly. During such movement of the selector shaft, the balls 90 are maintained in engagement with the sleeve 48 and maintain driving engagement between the second driven gear 46 and the drive shaft 28.

Another of the advantages of the invention is that the configuration of the leading portion of the gear box 25 of the propulsion leg 16 can have a parabolic shape as preferred since the gear box 25 need house only the bevel gears 24 and 29. This is permitted by locating the transmission 32 in the propulsion leg 16 and above the gear box 25.

Various of the features of the invention are set forth in the following claims.

I claim:

1. An outboard motor comprising a power head including an engine, a propulsion leg extending downwardly from said power head, an input shaft housed in said propulsion leg and driven by said engine, a drive shaft housed in said propulsion leg, a propeller shaft in said propulsion leg, means for drivingly connecting said drive shaft and said propeller shaft, a propeller mounted on said propeller shaft for rotation, first drive means between said input shaft and said drive shaft for selectively drivingly connecting said input shaft and said drive shaft, said first drive means including a first gear mounted on said input shaft and a first driven gear driven by said drive gear and mounted on said drive shaft, said first drive means selectively driving said drive shaft in the same rotational direction as said input shaft, second drive means for selectively drivingly connecting said input shaft and said drive shaft and including a second drive gear mounted on said input shaft, a second driven gear mounted on said drive shaft and in meshing engagement with said second drive gear, a sleeve between said second driven gear and said drive shaft, and a one-way overrunning clutch between said sleeve and said second driven gear, said second drive means having an input-output speed ratio with a first value, third drive means for selectively drivingly connecting said input shaft and said drive shaft and including a third drive gear mounted on said input shaft and a third driven gear mounted on said drive shaft and in meshing engagement with said third drive gear, said third drive means having an input-output speed ratio with a second value greater than said first value, said input shaft being drivingly connected to said gears mounted thereon, and means for alternatively and selectively drivingly connecting said drive shaft to said sleeve and to said first and third driven gears.

2. An outboard motor as set forth in claim 1, wherein said drive shaft includes an axially extending bore, and wherein said means for drivingly connecting one of said driven gears to said drive shaft includes a shiftable member housed in said axially extending bore and being shiftable between a first position, a second position, and a third position, and means for drivingly connecting said first driven gear to said drive shaft when said shiftable member is in said first position, said second driven gear to said drive shaft when said shiftable member is in said second position, and said third driven gear to said drive shaft when said shiftable member is in said third position.

3. An outboard motor as set forth in claim 1 wherein said second drive means provides a first forward speed, wherein said third drive means provides a second forward speed, and wherein said means for selectively drivingly connecting includes means for shifting from said first forward speed to said second forward speed and maintaining driving connection between said input shaft and said drive shaft during said shifting.

4. An outboard motor comprising a power head including an engine, a propulsion leg extending downwardly from said power head, an input shaft housed in said propulsion leg and driven by said engine, a drive shaft housed in said propulsion leg, a propeller shaft in said propulsion leg, means for drivingly connecting said drive shaft and said propeller shaft, a propeller mounted on said propeller shaft for rotation, a first drive gear, a second drive gear, and a third drive gear, said drive gears being driven by said input shaft, a first driven gear driven by said first drive gear, a second driven gear in mesh with said second drive gear, a sleeve between said second drive gear and said driven shaft, a one-way overrunning clutch between said sleeve and said second driven gear and a third driven gear disposed in meshing engagement with said third drive gear and being driven by said third drive gear, and means for selectively connecting one of said driven gears to said drive shaft for rotatably driving said drive shaft.

5. An outboard motor as set forth in claim 4 wherein said first drive gear, said second drive gear and said third drive gear are mounted for rotation coaxially with said input shaft, and wherein said first driven gear, second driven gear and third driven gear are mounted for rotation coaxially with said drive shaft.

6. An outboard motor as set forth in claim 4 wherein said selective connecting means includes a central axially extending bore in said drive shaft, and a selector shaft housed in said bore, and selectively axially movable in said bore between a neutral position, a second position, a third position, and a fourth position, and means cooperating with said selector shaft for drivingly connecting (a) said first driven gear to said drive shaft when said selector shaft is in said second position, (b) said second driven gear to said drive shaft when said selector shaft is in said third position, and (c) said third driven gear to said drive shaft when said selector shaft is in said fourth position.

7. An outboard motor as set forth in claim 4 wherein said driven gears are carried by said drive shaft and disposed in axially spaced relation on said drive shaft, and wherein said means for selectively connecting one of said driven gears to said drive shaft for rotatably driving said drive shaft includes an axial bore in said drive shaft, a selector shaft housed in said axial bore, said selector shaft being selectively longitudinally movable in said axial bore between a neutral position wherein said driven gears are freely rotatable with respect to said drive shaft, a second position wherein said first driven gear rotatably drives said drive shaft, a third position wherein said second driven gear rotatably drives said drive shaft, and a fourth position wherein said third driven gear rotatably drives said drive shaft.

8. An outboard motor as set forth in claim 4 wherein said first driven gear is driven in the same direction as said first drive gear.

9. An outboard motor as set forth in claim 4 wherein said means for selectively connecting one of said driven gears to said drive shaft includes an axial bore in said drive shaft, a plurality of transverse bores in said drive shaft and communicating with said axial bore, movable members carried by said transverse bores, and a selector shaft carried in said axial bore and shiftable in said axially extending bore between a neutral position, a second position, a third position, and a fourth position.

10. An outboard motor as set forth in claim 4 wherein said drive gears are carried on said drive shaft in axially spaced relation, and wherein said means for selectively connecting one of said driven gears to said drive shaft includes a plurality of movable members carried by said drive shaft and selectively movable into engagement with selective ones of said driven gears, and means for selectively causing movement of said movable members into engagement with said driven gears for drivingly connecting the selected one of said driven gear and said drive shaft.

11. An outboard motor as set forth in claim 10 wherein said drive shaft includes a central longitudinally extending bore, and wherein said means for causing movement of said movable members includes a selector shaft carried in said central bore, said selector shaft being shiftable with respect to said drive shaft between a first position, a second position, and a third position, said selector shaft engaging said movable members and causing selective powered movement of said movable members in response to axial movement of said selector shaft.

12. An outboard motor comprising a power head including an engine, a propulsion leg extending downwardly from said power head, an input shaft housed in said propulsion leg and driven by said engine, a drive shaft housed in said propulsion leg and having an axially extending bore, means for drivingly connecting said drive shaft and a propeller shaft, a propeller mounted on said propeller shaft for rotation therewith, and transmission means for drivingly connecting said input shaft and said drive shaft, said transmission means including a first drive gear and a second drive gear, said drive gears being driven by said input shaft, a first driven gear meshing with said first drive gear and being driven by said first drive gear, a second driven gear meshing with said second drive gear and being driven by said second drive gear, a sleeve interposed said second driven gear and said drive shaft, a one-way overrunning clutch between said sleeve and said second driven gear and means for selectively connecting one of said driven gears to said drive shaft for rotatably driving said drive shaft, said connecting means including a selector shaft carried in said axially extending bore and being shiftable in said axially extending bore between a first position, a second position, and a third position, said driven gears being freely rotatable with respect to said drive shaft when said selector shaft is in said first position, and means for drivingly connecting said first driven gear to said drive shaft when said selector shaft is in said second position and for drivingly connecting said sleeve to said drive shaft when said selector shaft is in said third position.

13. An outboard motor as set forth in claim 12 and wherein said drive shaft includes at least a pair of transverse bores therethrough, said bores being axially spaced apart, and wherein said means for selectively connecting includes a first movable member housed in one of said bores and movable from a first position to a position wherein said movable member engages said sleeve and causes said sleeve to be driven with said drive shaft, and a second movable member housed in a second of said bores and being movable from a first position to a position engaging said first driven gear and causing said first driven gear and said drive shaft to rotate together, and wherein said selector shaft includes means for causing said first movable member to move into engagement with said sleeve when said selector shaft is moved to said third position and means for causing said second movable member to move into engagement with said first driven gear when said selector shaft is moved to said second selector shaft position.

14. An outboard motor comprising a power head including an engine, a propulsion leg extending downwardly from said power head, an input shaft housed in said propulsion leg and driven by said engine, a drive shaft housed in said propulsion leg, one of said input shaft and said drive shaft including an axially extending bore, means for drivingly connecting said drive shaft and a propeller shaft, a propeller mounted on said propeller shaft for rotation therewith, and transmission means for drivingly connecting said input shaft and said drive shaft, said transmission means including a first drive gear and a second drive gear coaxial with said input shaft, a first driven gear coaxial with said drive shaft and in mesh with said first drive gear, a second driven gear coaxial with said drive shaft and in mesh with said second drive gear, said one of said input shaft and said drive shaft being rotatable relative to said gears coaxial therewith, the other of said input shaft and said drive shaft being fixed to said gears coaxial therewith, a sleeve member interposed said one shaft and said second gear coaxial therewith, an overrunning one-way clutch between said sleeve member and said second gear coaxial with said one shaft, a selector shaft carried in said axially extending bore and shiftable in said axially extending bore between a first position wherein said first gear coaxial with said one shaft and said sleeve member are freely rotatable with respect to said one shaft, a second position, and a third position, means for drivingly connecting said first gear coaxial with said one shaft to said one shaft when said selector shaft is in said second position, and means for drivingly connecting said sleeve member to said one shaft when said selector shaft is in said third position.

15. An outboard motor comprising a power head including an engine, a propulsion leg extending downwardly from said power head, an input shaft housed in said propulsion leg and driven by said engine, a drive shaft housed in said propulsion leg, means for drivingly connecting said drive shaft and a propeller shaft, a propeller mounted on said propeller shaft for rotation therewith, and transmission means for drivingly connecting said input shaft and said drive shaft, said transmission means including a first drive gear coaxial with said input shaft, a second drive gear coaxial with said input shaft, a first driven gear coaxial with said drive shaft and in mesh with said first drive gear, a second driven gear coaxial with said drive shaft and in mesh with said second drive gear, one of said input shaft and said drive shaft being rotatable relative to said gears coaxial therewith, the other of said input shaft and said drive shaft being fixed to said gears coaxial therewith for common rotation, a sleeve member between said one shaft and said second gear coaxial therewith, an overrunning one-way clutch between said sleeve member and said second gear coaxial with said one shaft, and actuating means operably connectable between said one said shaft and said first gear coaxial therewith and said sleeve member and movable between a first position wherein said first gear coaxial with said one shaft and said sleeve member are freely rotatable with respect to said one shaft, a second position establishing driving connection between said one shaft and said first gear coaxial therewith, and a third position establishing driving connection between said one shaft and said sleeve member, means for drivingly connecting said first gear coaxial with said one shaft to said one shaft when said selector shaft is in said second position, and means for drivingly connecting said sleeve member to said one shaft when said selector shaft is in said third position.

16. A transmission comprising an input shaft, a drive shaft, a first drive gear coaxial with said input shaft, a second drive gear coaxial with said input shaft, a first driven gear coaxial with said drive shaft and in mesh with said first drive gear, a second driven gear coaxial with said drive shaft and in mesh with said second drive gear, one of said input shaft and said drive shaft being rotatable relative to said gears coaxial therewith, the other of said input shaft and said drive shaft being fixed to said gears coaxial therewith for common rotation, a sleeve member between said one shaft and said second gear coaxial therewith, an overrunning one-way clutch between said sleeve member and said second gear coaxial with said one shaft, and actuating means operably connectable between said one shaft and said first gear coaxial therewith and said sleeve member and movable between a first position wherein said first gear coaxial with said one shaft and said sleeve member are freely rotatable with respect to said one shaft, a second position establishing driving connection between said one shaft and said first gear coaxial therewith, and a third position establishing driving connection between said one shaft and said sleeve member.

17. A transmission comprising an input shaft, a drive shaft, a first drive gear coaxial with said input shaft, a second drive gear coaxial with said input shaft, a first driven gear coaxial with said drive shaft and in mesh with said first drive gear, a second driven gear coaxial with said drive shaft and in mesh with said second drive gear, one of said input shaft and said drive shaft being rotatable relative to said gears coaxial therewith, the other of said input shaft and said drive shaft being fixed to said gears coaxial therewith for common rotation, a sleeve member between said one shaft and said second gear coaxial therewith, an overrunning one-way clutch between said sleeve member and said second gear coaxial with said one shaft, and means for selectively operably connecting said one said shaft to said first gear coaxial therewith and to said sleeve member.

18. An outboard motor comprising a power head including an engine, a propulsion leg extending downwardly from said power head, an input shaft housed in said propulsion leg and driven by said engine, a drive shaft housed in said propulsion leg, means for drivingly connecting said drive shaft and a propeller shaft, a propeller mounted on said propeller shaft for rotation therewith, and transmission means for drivingly connecting said input shaft and said drive shaft, said transmission means including a first drive gear coaxial with said input shaft, a second drive gear coaxial with said input shaft, a first driven gear coaxial with said drive shaft and in mesh with said first drive gear, a second driven gear coaxial with said drive shaft and in mesh with said second drive gear, one of said input shaft and said drive shaft being rotatable relative to said gears coaxial therewith, the other of said input shaft and said drive shaft being fixed to said gears coaxial therewith for common rotation, a sleeve member between said one shaft and said second gear coaxial therewith, an overrunning one-way clutch between said sleeve member and said second gear coaxial with said one shaft, and means for operably connecting said one said shaft to said first gear coaxial therewith and to said sleeve member.

* * * * *